United States Patent

[11] 3,620,310

[72] Inventor Clarence B. Richey
Royal Oak, Mich.
[21] Appl. No. 843,477
[22] Filed July 22, 1969
[45] Patented Nov. 16, 1971
[73] Assignee Massey-Ferguson Inc.
Detroit, Mich.

[54] IMPLEMENT SPRING CUSHION
3 Claims, 7 Drawing Figs.

[52] U.S. Cl. ........................................... 172/600,
172/568, 172/595
[51] Int. Cl. .......................................... A01b 23/04,
A01b 21/08
[50] Field of Search ......................................... 172/544,
545, 546, 551, 568, 569, 570, 572, 773, 579, 583,
584, 599, 600, 604

[56] References Cited
UNITED STATES PATENTS

| | | | |
|---|---|---|---|
| 1,817,851 | 8/1931 | Shelton | 172/573 |
| 2,979,138 | 4/1961 | Martensen | 172/572 |
| 3,454,106 | 7/1969 | Youngberg et al. | 172/568 |

*Primary Examiner*—Robert E. Pulfrey
*Assistant Examiner*—C. W. Hanor
*Attorney*—Gerhardt, Greenlee & Farris ABSTRACT: A disc harrow comprises a peripheral frame and pairs of front and rear gangs mounted on gang frames. A foldable wing is provided at the end of each gang to enable folding to a narrower dimension for transport. The inner end of each gang frame mounts a plate having a threaded aperture that receives a bolt pivotally mounted on the implement pull tube. This permits pivotal movement of the gang frame about its longitudinal axis. Each gang frame projects outwardly through a rectangular aperture in the corner of the peripheral frame. A lever centrally pivoted to the peripheral frame corner engages the gang frame at one end. A compression spring unit pivoted to the frame corner is pivoted to the other end of the lever. As the discs encounter an obstruction, the gang frame pivots to lift the discs over the obstruction. This pivots the lever which compresses and pivots the spring unit such that increasing spring compression decreases the lever arm at which the spring acts on the lever. This provides a constant spring force resisting the pivotal movement of the gang frame.

INVENTOR.
CLARENCE B. RICHEY

INVENTOR.
CLARENCE B. RICHEY
BY
Gerhardt, Greenlee & Farris
ATTORNEYS.

INVENTOR.
CLARENCE B. RICHEY
BY
Gerhardt, Greenlee & Farris
ATTORNEYS.

IMPLEMENT SPRING CUSHION

This invention relates generally to earthworking implements and more particularly to a spring cushion for a disc harrow gang frame.

With the advent of tractors with increased horsepower, extremely large implements are increasingly used by today's farmers. Implements such as disc harrows, rakes and cultivators are often used in gangs of substantial width. These wide implements are extremely heavy and do not readily move over obstructions such as rocks.

It has been proposed to provide such large implements, such as disc harrows, with spring cushion means to permit pivotal movement of one gang to lift the discs over an obstruction without disturbing the working attitude of the other gangs and without placing undue stress on the implement structure. This type of spring cushion comprises a compression or extension spring which is increasingly stressed by increasing pivotal movement, thereby providing a nonuniform resistance to encountered obstructions. Thus, the greater the deflection, the greater the stress placed on the implement structure and the greater the disturbance of the working attitude of the other gangs.

It is therefore an object of this invention to provide a spring cushion for an implement which permits pivotal movement of the implement frame to enable the implement to move over obstructions and which resists such movement with a constant force.

In accordance with this invention an earthworking implement is provided having a mounting frame adapted for pulling by a tractor, an earth-working tool mounted beneath the tool frame, pivot means mounting the tool frame on the mounting frame for pivotal movement about an axis extending along the tool frame to permit movement of the tool over obstructions, spring cushion means interconnecting the tool and mounting frames for posing such pivotal movement with a substantially constant force, and cooperable abutment means on the tool and mounting frames for limiting such pivotal movement.

These and further objects and features of this invention will become more readily apparent upon reference to the following detailed description of a preferred embodiment shown in the attached drawings, wherein.

Figure 1:
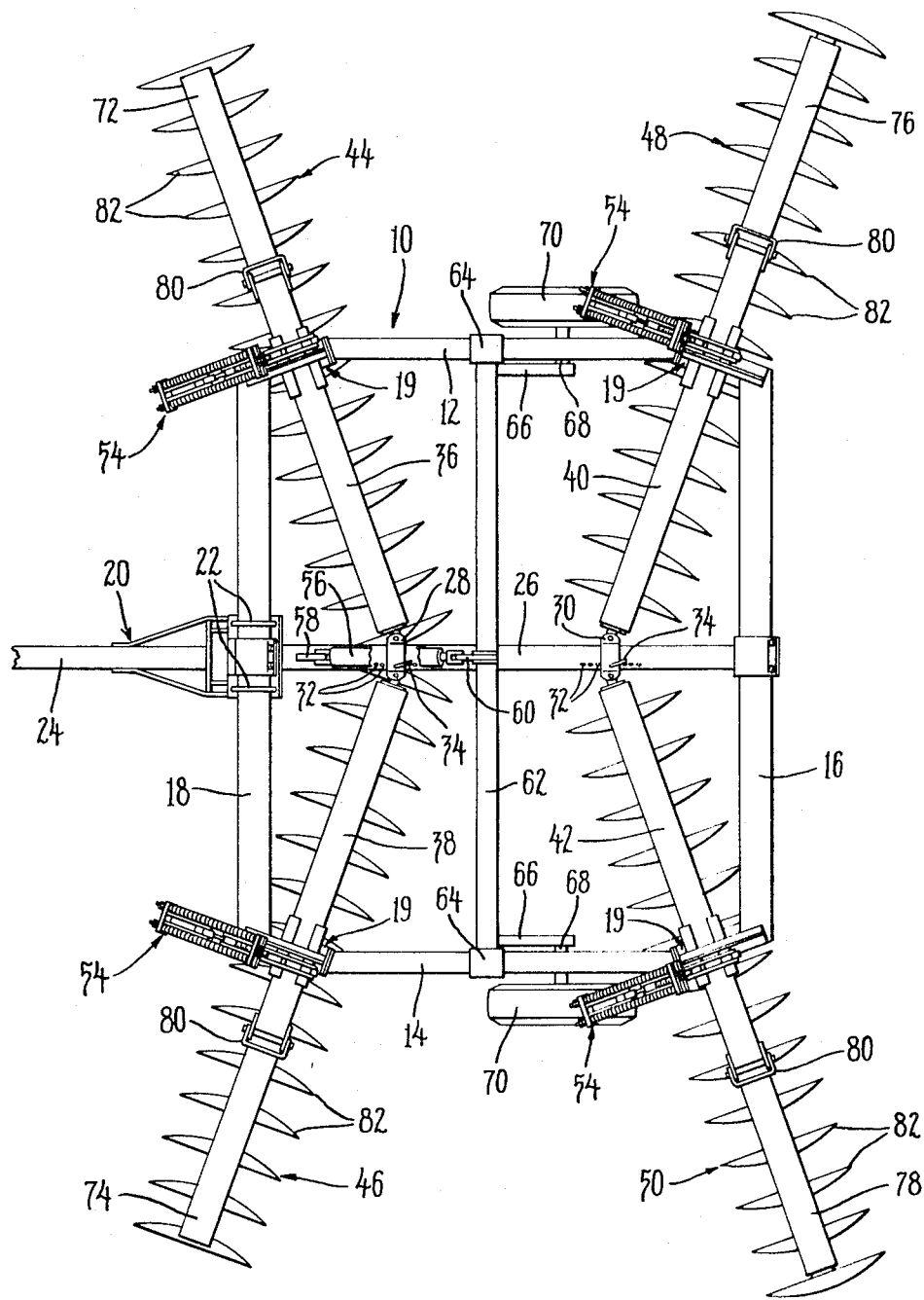
FIG. 1 is a plan view of an implement having folding wings provided with spring cushion means according to this invention.

Referring now to FIG. 1 of the drawings, a disc harrow, generally indicated 10, comprises a perimeter frame including longitudinal side members 12 and 14 and rear and front transverse members 16 and 18, all of which are rigidly interconnected by corner members 19. A drawbar frame assembly 19 is attached by clamps 22 to the midportion of the front transverse member 18. The drawbar frame assembly includes a conventional forwardly extending drawbar 24 which is adapted to be connected to a conventional tractor hitch (not shown). A central longitudinal frame member or pull tube 26 is welded to the drawbar frame assembly clamp plate and to a rear clamp, thus rigidly interconnecting members 16 and 18 and mounts thereon front and rear brackets 28 and 30 respectively. Frame member 26 is provided with a plurality of apertures 32 which receive locking pins 34 carried by brackets 28 and 30 for longitudinally positioning the brackets.

Each of the brackets pivotally mounts the inner end of gang frame members 36, 38, 40 and 42 of front and rear disc gangs 44, 46, 48 and 50, as will be later described. The gang frame members 36, 38, 40 and 42 extend outwardly at an angle to frame member 26 and through corner members 19, as will be later described. Each of the gang frame members 36, 38, 40 and 42 are provided with a spring cushion overload release 54, described later, to accommodate any obstructions, such as rocks, encountered by the implement by allowing movement of the disc gangs.

A hydraulic cylinder 56, conventionally powered by tractor hydraulics (not shown), is rigidly mounted at 58 on frame member 26. The piston rod of cylinder 56 is connected at 60 to a transverse shaft 62 which is journaled at 64 in the side frame members 12 and 14. Rigidly attached to the outer ends of shaft 62 is a pair of rearwardly extending lever arms 66 which mount axles 68 that carry a ground-engaging wheel 70.

Frame extension members or wings 72, 74, 76 and 78 are pivotally connected to the frame members 36, 38, 40 and 42 by hinges 80 for folding to a travel position, and are provided with conventionally mounted discs 82. Selective actuation of cylinder 56 pivots shaft 62 to move the wheel 70 relative to the frame to raise and lower the discs 82 between working and travel positions.

Since the pivotal mounting of all of the gangs 44, 46, 48 and 50 and of the spring cushions 54 are the same, only one of them, gang 46 and its spring cushion, will be described in detail with reference to FIGS. 2 through 7.

Figure 2:
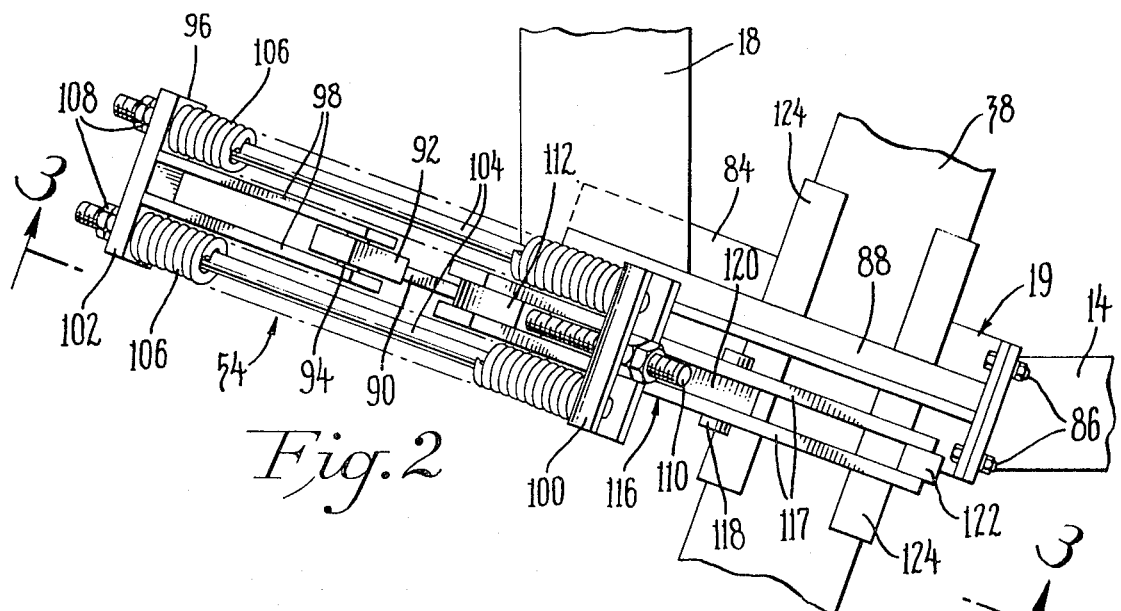
FIG. 2 is an enlarged detail view of a portion of FIG. 1, showing one of the spring cushion means in greater detail.
Figure 3:
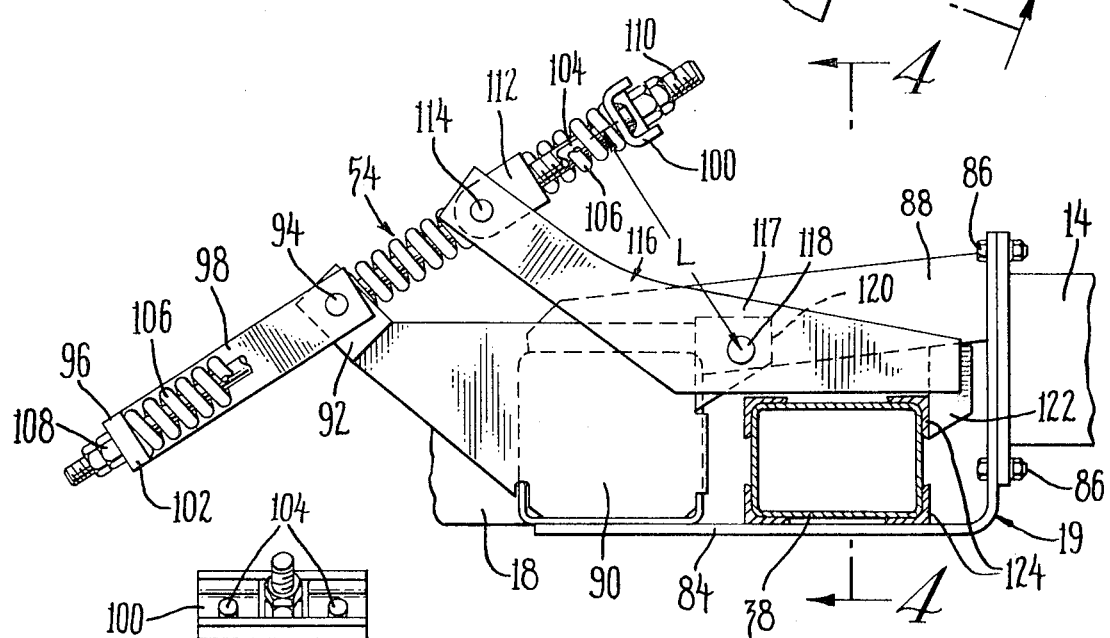
FIG. 3 is a sectional view taken generally along lines 3—3 of FIG. 2.
Figure 4:
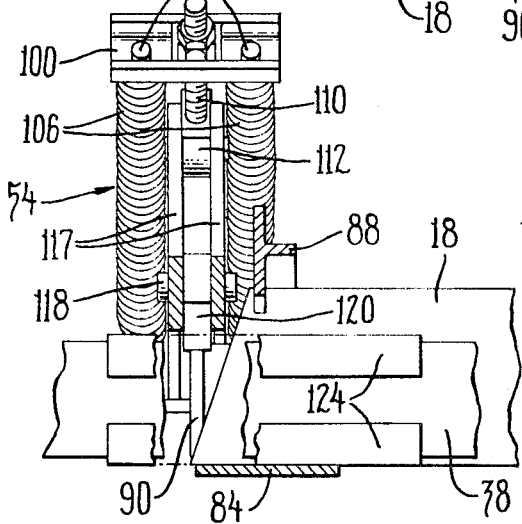
FIG. 4 is a sectional view taken generally along lines 4—4 of FIG. 3.

Referring now to FIGS. 2, 3 and 4, it is readily seen that the corner member 19 comprises an L-shaped plate 84 which has its upright bolted at 86 to an end flange of side member 14. The leg of plate 84 is welded or otherwise secured to the front transverse member 18. As an additional support, a T-beam 88 extends rigidly between the front member 18 and the upper flange portion of the plate 84, thereby creating a generally rectangular opening through which the gang frame 38 projects.

A mounting plate 90 is welded onto the end of front member 18 and includes an upwardly projecting left ear 92 that carries a pivot pin 94. The spring cushion 54 includes a bracket 96 having a pair of parallel arms 98 that are mounted to the ends of pivot pin 94 to pivotally mount the spring cushion 54 on the implement frame. Spring cushion 54 further includes an end plate 100 that rigidly mounts a pair of elongated rods 104. Rods 104 extend through apertures in end portion 102 of bracket 96 and carry compression springs 106 which force end portion 102 outwardly against nuts 108 threaded onto the end of the rods 104. End bracket 100 mounts a rod 110 that carries a block 112 and a pivot pin 114 at its other end.

A lever 116 includes a pair of spaced identical members 117 that are pivoted by a pin 118 to an upper right ear 120 of mounting bracket 90. The left ends of members 117 are pivoted to the pin 114 to pivotally interconnect lever 116 with the spring cushion 54. The right ends of members 117 mount a depending arm 122 that engages one of four strips of angle iron 124 welded to the corners of the gang frame 38.

Figure 5:
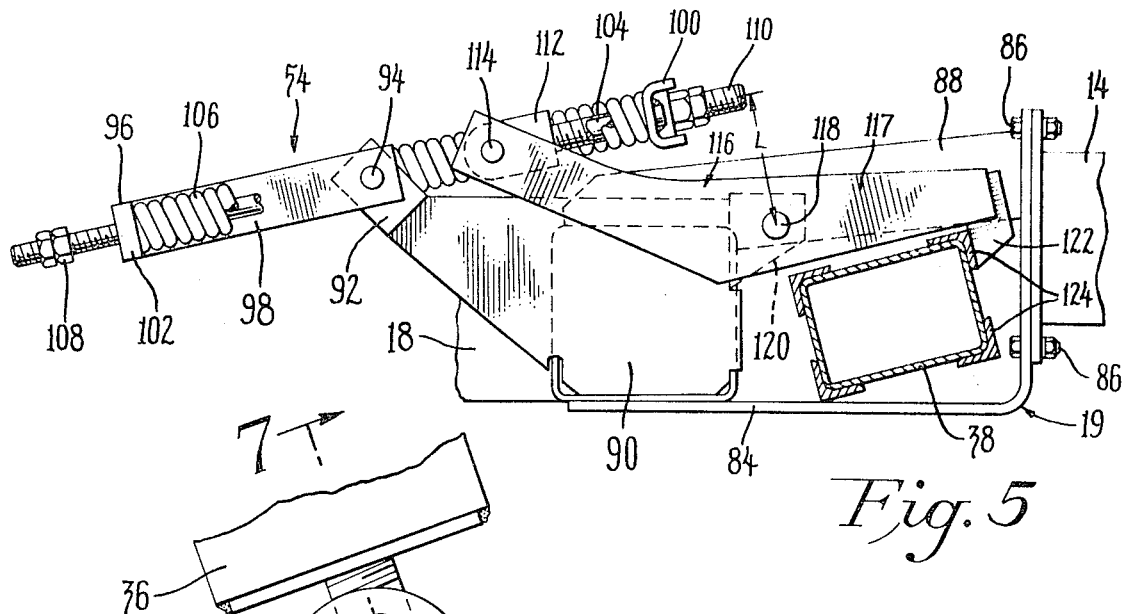
FIG. 5 is a view similar to FIG. 4 showing operation of the spring cushion means upon countering an obstruction.

The operation of the spring cushion means will now be described with reference to FIGS. 3 and 5. When one of the discs mounted on gang frame 38 encounters an obstruction, the gang frame 38 pivots counterclockwise about its longitudinal axis as shown in FIG. 5. This action pivots lever 116 counterclockwise, moving rod 110 leftwardly Since bracket 96 is attached at 94 to mounting plate 90, springs 106 compress against end portion 102. As springs 106 compress, their spring rate increases. To provide a constant resisting force, the increase in the spring rate must be negated. This is accomplished, as readily seen by comparing FIGS. 3 and 5, by decreasing the effective lever arm L at which lever 116 acts on the springs 106. This results from the pivoting of spring cushion 54 clockwise about pivot 94 toward pivot 118. The actual spacing of pivots 118, 114 and 94 and the lever arm length L of any particular installation will depend upon the type and strength of springs 106 that are used. In order to limit the amount of pivotal movement of the gang frame 38, the upper right-angle strip 124 will engage the bottom of T-beam 88.

Figure 6:
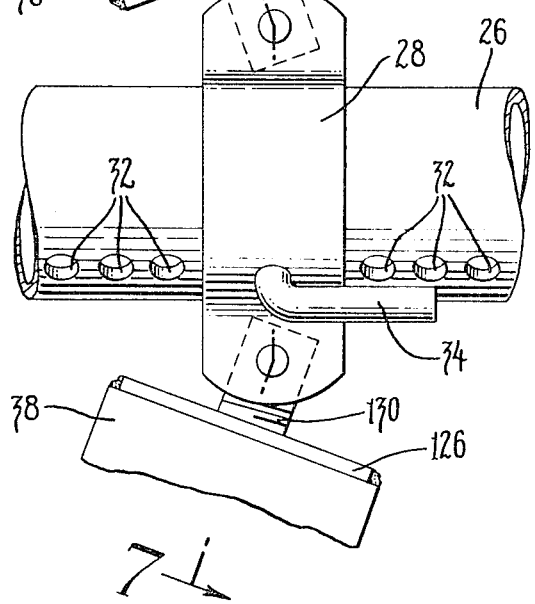
FIG. 6 is an enlarged detail view of the pivotal mounting of the inner end of one of the gang frames.
Figure 7:
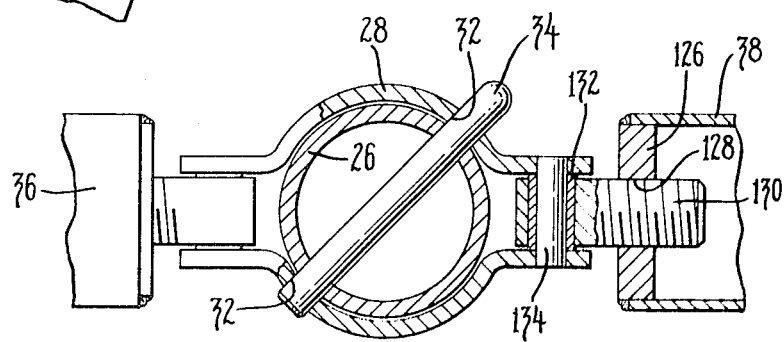
FIG. 7 is a sectional view taken generally along lines 7—7 of FIG. 6.

To permit free pivotal movement of the gang frame 38, the inner ends of all gang frames are pivotally mounted to the pull tube 26, as will now be described with reference to FIGS. 6 and 7. A metal plate 126 is welded to the inner end of the gang frame 38 and includes a threaded aperture 128. A stud 130 is threaded into the plate 126 and is mounted to a bushing 132 to a pin 134 mounted on the bracket 28. Thus when the discs encounter the obstruction as previously described, the gang frame 38 freely pivots on the stud 130, while being axially retained against movement by the threaded engagement.

Thus, this invention comprises means for mounting an implement tool frame for pivotal movement against a constant resisting force to provide cushion means to diminish the effects of encountered sbstructions.

I claim:

1. An earthworking implement having a mounting frame adapted for pulling by a tractor, a tool frame extending laterally of the mounting frame, an earthworking tool mounted beneath the tool frame, pivot means mounting the tool frame on the mounting frame for pivotal movement about an axis extending along the tool frame to permit movement of the tool over obstructions, the pivot means mounting the tool frame on the mounting frame include a pin carried by the mounting frame and an apertured plate carried by the one end of the tool frame and engaging the pin for relative pivotal movement about the aforesaid axis, wherein the pin and apertured plate are cooperably threaded for engagement to restrain movement of the tool frame along the axis, and spring cushion means interconnecting the mounting and tool frames opposing pivotal movement of the tool frame relative to the mounting frame with a substantially constant force.

2. An earthworking implement having a mounting frame adapted for pulling by a tractor, a tool frame extending laterally of the mounting frame, an earthworking tool mounted beneath the tool frame, pivot means mounting the tool frame on the mounting frame for pivotal movement about an axis extending along the tool frame to permit movement of the tool over obstructions, and spring cushion means interconnecting the mounting and tool frames opposing pivotal movement of the tool frame relative to the mounting frame, the spring cushion means include a spring unit pivotally mounted on the mounting frame, a lever pivotally connected to the mounting frame, and means pivotally connecting the lever to the spring unit at a spaced point for stressing the spring unit at a lever arm length, the lever engaging an intermediate portion of the tool frame at a spaced point for pivotal movement in response to pivotal movement of the tool frame, such pivotal movement of the lever effecting increasing stressing of the spring unit at a decreasing lever arm length to provide a substantially constant force opposing tool frame pivotal movement.

3. An earthworking implement having a mounting frame adapted for pulling by a tractor, a tool frame extending laterally of the mounting frame, an earthworking tool mounted beneath the tool frame, pivot means mounting the tool frame on the mounting frame for pivotal movement about an axis extending along the tool frame to permit movement of the tool over obstructions, and spring cushion means interconnecting the mounting and tool frames opposing pivotal movement of the tool frame relative to the mounting frame, the spring cushion means include a lever centrally pivoted to the mounting frame, means engaging one end of the lever with the tool frame for pivotal movement thereby upon pivotal movement of the tool frame, a spring unit pivoted to the mounting frame, and means pivoting the other end of the lever to the spring unit for increasingly stressing the spring unit at a decreasing lever arm length upon pivotal movement of the tool frame to provide the substantially constant force opposing pivotal movement of the tool frame relative to the mounting frame.

* * * * *